No. 702,264. Patented June 10, 1902.
G. N. VIS.
VACUUM APPARATUS FOR BOILING BRINE.
(Application filed July 13, 1900.)
(No Model.)
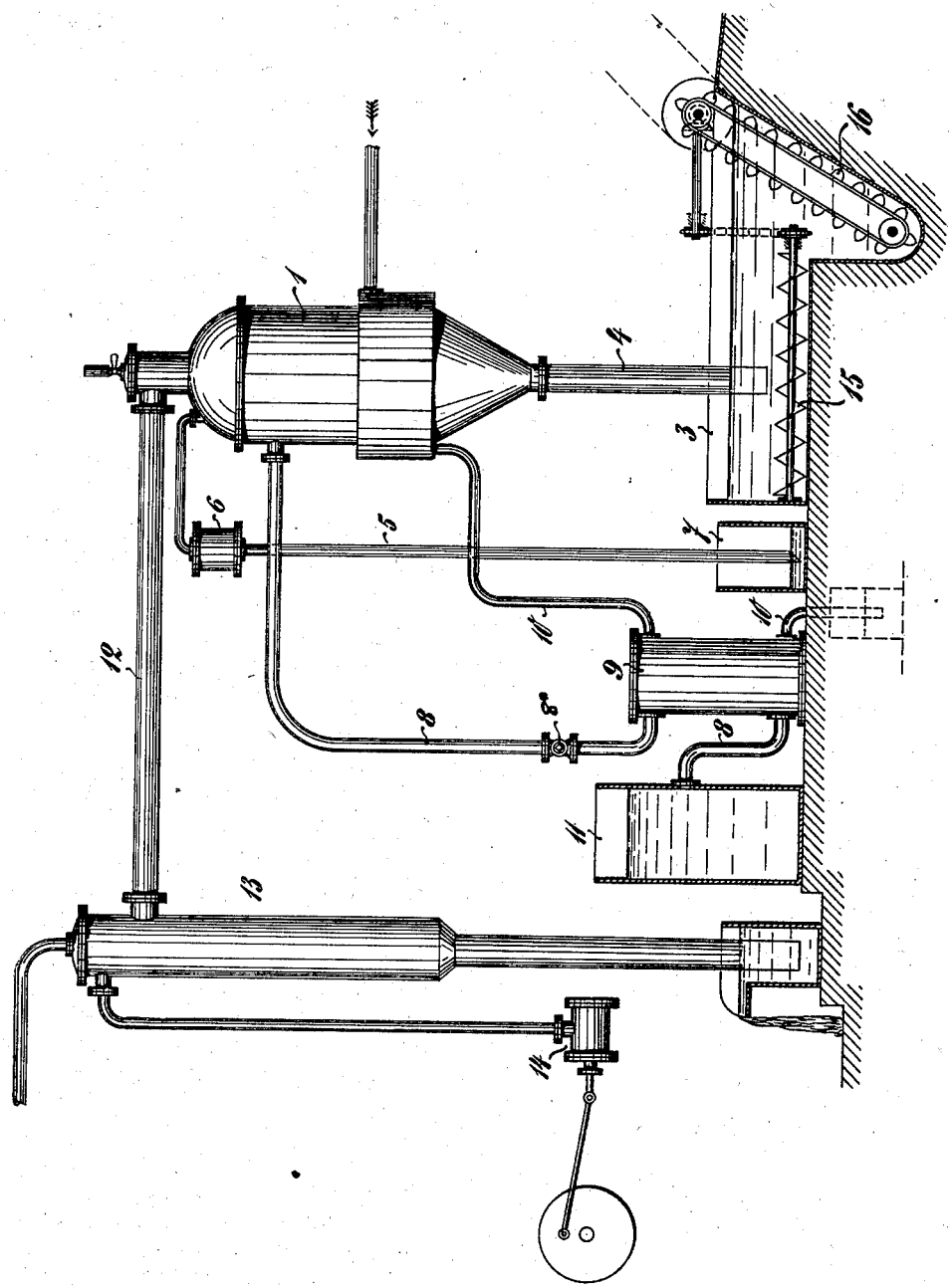
Witnesses:
Inventor:
Gerhard N. Vis

UNITED STATES PATENT OFFICE.

GERHARD NICOLAAS VIS, OF SCHWEIZERHALLE, SWITZERLAND.

VACUUM APPARATUS FOR BOILING BRINE.

SPECIFICATION forming part of Letters Patent No. 702,264, dated June 10, 1902.

Application filed July 13, 1900. Serial No. 23,494. (No model.)

*To all whom it may concern:*

Be it known that I, GERHARD NICOLAAS VIS, doctor of philosophy and chemist, a subject of the Queen of the Netherlands, residing at Schweizerhalle, near Basle, Switzerland, have invented a new and useful Vacuum Apparatus for Boiling Brine, of which the following is a specification.

This invention relates to an improvement upon that class of vacuum apparatus for boiling brine shown and described in my prior application, Serial No. 741,417, filed December 23, 1899, the pan of which communicates at the lower conical end through a tubular extension or leg with a brine vessel open to the atmosphere and is provided with a pipe descending from its top part and dipping with its lower open end into a liquid seal, the pan being fed with brine through its said leg by means of the combined action of the vacuum in the pan and the air-pressure on the brine in said vessel, and the salt separated out in the pan and accumulating in the conical bottom part being periodically discharged from the pan by causing air to penetrate into the same through said normally sealed pipe, as described in my said application. In using this apparatus I have found that the supply of brine to the pan through its tubular extension is apt to interfere with the accumulation of the separated salt in the lower part of its conical bottom, so that at each discharge a great portion of the separated salt is left behind in the pan, and consequently the discharge operation has to be repeated at very short intervals. Moreover, this frequency of the discharge furthers the formation of crusts on the heating-pipes, part of which becomes uncovered at each back rush of the brine.

To obviate these inconveniences is the object of the present invention, which to this end consists in connecting the pan at a point above its heating-pipes through a feed-pipe with a brine-reservoir, so that the pan is at all times fed with the brine from above its heating-pipes, whereby the incrustation of said pipes is retarded and no counter effect opposed to the accumulation of the salt in the lower bottom part of the pan. To still further retard the formation of crusts and at the same time to better utilize the fuel, the brine is preheated by means of the condensation-water forming in the heating-pipes of the pan, said water and the brine being caused to meet each other on the counter-current principles.

The improved apparatus is illustrated on the annexed sheet of drawings, which is an elevation of the complete apparatus.

1 indicates the pan with the heating-pipes 2 3, the open brine vessel below, into which the pan dips, with its tubular bottom extension 4, and 5 the pipe, which descends from the top part of the pan and is provided with an upper enlarged portion 6 for preventing liquid to be sucked in the pan from the air-pipe and dips with its lower open end into the sealing liquid contained in the open vessel 7.

8 is the brine-supply pipe connecting the pan at a point above the heating-pipes 2 with the brine-reservoir 11. As shown, the supply-pipe 8 is made the heat-receiving member of a heat-exchanging apparatus 9, fed through pipe 10, with the condensation-water forming in the heating-pipes 2.

When the crusts forming upon the heating-pipes of the pan have grown to such thickness as to interfere with the proper heat transmission through the walls of said pipes to the surrounding brine, which occurs after a considerably longer boiling period than in the aforesaid apparatus in which the pan is fed with brine through its bottom extension from the vessel below, the vacuum-generating apparatus is stopped, so that the brine rushes back from the pan in the vessel 3 below, the pan extension 4 closed by placing a plate against its mouth, the vacuum-generating apparatus restarted, and the pan refilled through pipe 8 with fresh brine, which readily dissolves away the greater part of the crusts, when the plate is removed from the extension 4 and the boiling continued. To generate and maintain the vacuum, I may use any of the well-known apparatus heretofore used for that purpose; but I prefer, as is also known, to connect the top of the pan through pipe 12 with a condenser 13 of the well-known cataract type, which is connected with an air-pump 14.

The vessel 3 is provided in its bottom part with a conveyer 15 for carrying the salt to another conveyer 16, by which it is transported to a drying plant. (Not shown.) These arrangements are well-known to those skilled in the art, and therefore need not be described in a more detailed manner.

I prefer to provide the supply-pipe 8 with a cock 8*, so that the pan can from time to time be filled with pure (preferably hot) water to perfectly free it from crusts and other deposits.

I claim—

In apparatus for boiling brine the combination with a brine vessel open to the atmosphere, a pan provided at its lower end with a tubular extension located in said vessel, a system of heating-pipes located in said pan, means for creating a vacuum in said pan, a pipe descending from the top part of the pan, and a liquid seal for the lower open end of said pipe, of a pipe connecting the pan at a point above the heating-pipes with the brine-supply reservoir, a heat-exchanging apparatus the heat-receiving member of which is constituted by a portion of said pipe, and a pipe for supplying the heat-transmitting member of said apparatus with the condensated water formed in the heating system of the pan, substantially as and for the purpose stated.

In testimony whereof I have hereunto set my hand in presence of two subscribing witnesses.

GERHARD NICOLAAS VIS.

Witnesses:
GEORGE GIFFORD,
ALBERT GRAETER,